(12) United States Patent
Brennan

(10) Patent No.: US 8,443,784 B2
(45) Date of Patent: May 21, 2013

(54) INTERNAL COMBUSTION ENGINE AND METHOD FOR CONTROL

(75) Inventor: Daniel G. Brennan, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/267,484

(22) Filed: Oct. 6, 2011

(65) Prior Publication Data

US 2013/0087111 A1  Apr. 11, 2013

(51) Int. Cl.
*F02D 13/06* (2006.01)

(52) U.S. Cl.
USPC ............ 123/435; 123/572; 123/DIG. 11; 123/90.15; 123/198 D; 123/198 F

(58) Field of Classification Search
USPC ............ 123/DIG. 11, 90.15–90.18, 198 D, 123/198 F, 435, 572–574
See application file for complete search history.

(56) References Cited

U.S. PATENT DOCUMENTS

| | | | | |
|---|---|---|---|---|
| 3,682,148 A * | 8/1972 | Harrison et al. | ............. | 123/328 |
| 3,754,538 A * | 8/1973 | Ephraim et al. | ......... | 123/41.86 |
| 4,067,306 A * | 1/1978 | Berich et al. | ............. | 123/198 D |
| 4,086,900 A * | 5/1978 | Marsh | ........................ | 123/198 D |
| 4,347,817 A * | 9/1982 | Muller | ........................ | 123/325 |
| 4,513,706 A * | 4/1985 | Atzet | ........................ | 123/198 D |
| 4,541,367 A * | 9/1985 | Lindberg | .................. | 123/25 M |
| 5,024,191 A * | 6/1991 | Nagahiro et al. | ......... | 123/198 D |
| 6,098,603 A * | 8/2000 | Maegawa et al. | ............. | 123/572 |
| 6,779,388 B2 * | 8/2004 | Baeuerle et al. | ............. | 73/114.31 |
| 7,673,620 B2 * | 3/2010 | Maehara et al. | ............. | 123/572 |
| 7,900,612 B2 * | 3/2011 | Knaus et al. | .................. | 123/574 |
| 8,127,740 B2 * | 3/2012 | Matsuda et al. | ............. | 123/198 F |
| 8,141,545 B2 * | 3/2012 | Matsuura et al. | ............. | 123/572 |
| 2008/0060604 A1 * | 3/2008 | Chipperfield | ............. | 123/193.6 |
| 2010/0192925 A1 * | 8/2010 | Sadakane | ..................... | 123/520 |

* cited by examiner

*Primary Examiner* — Erick Solis
(74) *Attorney, Agent, or Firm* — Cantor Colburn LLP

(57) ABSTRACT

In one exemplary embodiment of the invention an internal combustion engine includes a piston disposed in a cylinder, a valve configured to control flow of air into the cylinder and an actuator coupled to the valve to control a position of the valve. The internal combustion engine also includes a controller coupled to the actuator, wherein the controller is configured to close the valve when an uncontrolled condition for the internal engine is determined.

16 Claims, 1 Drawing Sheet

INTERNAL COMBUSTION ENGINE AND METHOD FOR CONTROL

FEDERAL RESEARCH STATEMENT

This invention was made with Government support under Agreement No. DE-FC26-05NT42415, awarded by the Department of Energy. The U.S. Government has certain rights in the invention.

FIELD OF THE INVENTION

The subject invention relates to internal combustion engines and, more particularly, to a method for arresting uncontrolled condition for internal combustion engines.

BACKGROUND

A conventional internal combustion engine controls the amount of air supplied to cylinders of the engine via a camshaft. After intake, the air may be mixed with fuel for combustion. For diesel engines, the engine speed (revolutions per minute or RPM) is controlled by the amount of fuel injected into the cylinders for combustion. After the air/fuel mixture is ignited, the combustion gases exit the cylinders through exhaust valves.

In an embodiment, a diesel engine may experience uncontrolled condition wherein the operator reduces fuel intake to decelerate the engine and oil is consumed as fuel in the cylinders. The oil may be transmitted to the cylinder from a crankcase in fluid communication with the cylinders. Specifically, a conduit or breather pipe feeds into the cylinder to vent the crankcase. In the embodiment, fluid, such as air and/or exhaust, can carry oil mist from the crankcase into the air intake via the breather. The engine can run on this oil mist in addition to or instead of fuel in the cylinders, thereby causing the engine speed to increase as this oil is taken in as extra "fuel". The increased engine speed includes increased piston revolutions which can draw more oil mist from the crankcase and into the engine. In some cases, the engine reaches a point where oil is drawn from the crankcase and shutting off the fuel flow into the cylinders will not stop the engine.

SUMMARY OF THE INVENTION

In one exemplary embodiment of the invention, an internal combustion engine includes a piston disposed in a cylinder, a valve configured to control flow of air into the cylinder and an actuator coupled to the valve to control a position of the valve. The internal combustion engine also includes a controller coupled to the actuator, wherein the controller is configured to close the valve when a condition for the internal engine is determined.

In another exemplary embodiment of the invention, a method for arresting a runaway condition for an engine includes monitoring a pressure of a cylinder in the engine and comparing the pressure to a pressure limit. The method also includes closing an air intake valve disposed on the cylinder if the pressure exceeds the pressure limit, wherein closing the air intake valve reduces air circulation between a crankcase and the cylinder.

The above features and advantages and other features and advantages are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
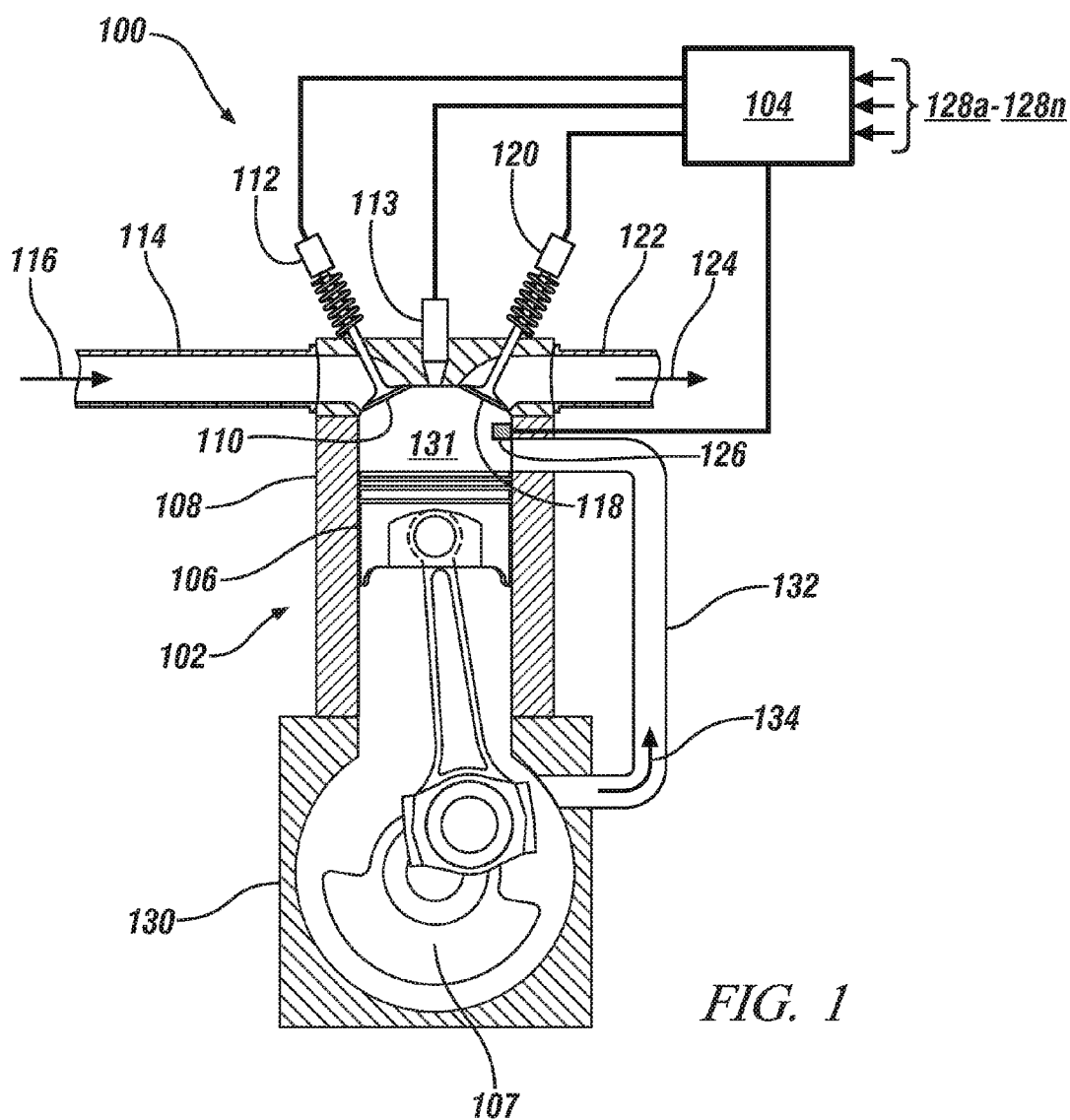
FIG. 1 is a schematic diagram of an exemplary internal combustion engine system.

The following description is merely exemplary in nature and is not intended to limit the present disclosure, its application or uses. It should be understood that throughout the drawings, corresponding reference numerals indicate like or corresponding parts and features. As used herein, the terms controller and module refer to an application specific integrated circuit (ASIC), an electronic circuit, a processor (shared, dedicated, or group) and memory that executes one or more software or firmware programs, a combinational logic circuit, and/or other suitable components that provide the described functionality. In embodiments, a controller or module may include one or more sub-controllers or sub-modules.

In accordance with an exemplary embodiment of the invention, FIG. 1 is a schematic diagram of a portion of an internal combustion (IC) engine system 100. The IC engine system 100 includes an internal combustion (IC) engine 102 and a controller 104. In an embodiment, the IC engine 102 is a diesel engine. The IC engine 102 includes a piston 106 disposed in a cylinder 108. For ease of understanding a single cylinder 108 is depicted, however, it should be understood that the IC engine 102 may include a plurality of pistons 106 disposed in a plurality of cylinders 108, wherein each of the cylinders 108 receive a combination of combustion air and fuel via the depicted arrangement. A combustion air/fuel mixture is combusted resulting in reciprocation of the pistons 106 in the cylinders 108. The reciprocation of the pistons 106 rotates a crankshaft 107 located within a crankcase 130 to deliver motive power to a vehicle powertrain (not shown) or to a generator or other stationary recipient of such power (not shown) in the case of a stationary application of the IC engine 102.

The air/fuel mixture is formed from an air flow 116 received via an air intake 114 and a fuel supply 113, such as a fuel injector. A valve 110 is disposed in the air intake 114 to control fluid flow and fluid communication of air between the air intake 114 and the cylinder 108. In exemplary embodiments, position of the valve 110 and the corresponding air flow 116 are controlled by an actuator 112 in signal communication with and controlled by the controller 104. After combustion of the air/fuel mixture, an exhaust gas 124 flows from the cylinder via exhaust passage 122. An exhaust valve 118 is coupled to an actuator 120 to control fluid flow and communication between the cylinder 108 and the exhaust passage 122. In an embodiment, the controller 104 communicates with the actuator 120 to control movement of the actuator 120. The controller 104 collects information regarding the operation of the IC engine 102 from sensors 128a-128n, such as temperature (intake system, exhaust system, engine coolant, ambient, etc.), pressure, and exhaust flow rates, and uses the information to monitor and adjust engine operation. In addition, the controller 104 controls fluid flow from the fuel injector 113 into the cylinder 108. The controller 104 is also in signal communication with a sensor 126, which may be configured to monitor a variety of cylinder parameters, such as pressure or temperature.

The crankcase 130, is in fluid communication with a combustion chamber 131 of cylinder 108 via a positive crank case ventilation passage ("PCV") 132. The passage 132 serves as a vent for excess blow-by pressure and amounts of unburned fuel and exhaust gases that may escape around the piston 106 to enter the crankcase 130. Ventilation of these gases helps reduce leakage of gases through gaskets, seals or joints, thereby improving engine operation. In embodiments, a fluid flow 134 (e.g., gas, such as air, exhaust, unburned fuel, etc.) carries small amounts of oil, such as oil mist, from the crankcase 130 into the combustion chamber 131. The oil flowing through passage 132 may cause an uncontrolled condition for the IC engine 102, wherein the oil is consumed as fuel for combustion. The depicted embodiment of the IC engine system 100 reduces occurrence of the uncontrolled condition via control of air intake 116 into the cylinder 108.

The depicted IC engine 102 may be referred to as a "camless" engine, wherein flow of fuel and air are controlled via actuators 112 and 120, rather than by rotation of a cam. Specifically, the position of valves 110 and 118 are controlled by actuators 112 and 120, respectively, which are controlled via signals from the controller 104. The intake and exhaust valves 110 and 118 may be any suitable flow control device for controlling fluid flow into and out of cylinder 108, wherein the lift or position of each valve corresponds to a level of fluid communication to or from the cylinder 108. The actuators 112 and 120 are any suitable actuators that control the position of each valve. In an embodiment, the actuators 112 and 120 are hydraulic actuators configured to control valve lift via linear actuation of the valves 110 and 118. In an embodiment, electric solenoids are coupled to or included as a part of the actuators 112 and 120 to enable actuation via the controller 104.

The controller 104 is configured to determine an uncontrolled condition in the IC engine 102 by monitoring one or more engine operating parameters. For example, the controller 104 may determine an engine pressure via the sensor 126, wherein the pressure is compared to established values or limits to identify an uncontrolled condition for the engine. The limit may be determined from previous data, such as through dynamometer testing, or estimates based on simulations. The limit may be determined by the controller 104 for a set of conditions, such as amount of fuel injected, atmospheric conditions and other factors. In embodiments, the uncontrolled condition may be determined by monitoring engine acceleration or torque along with other parameters, including vehicle weight and road grade.

In one embodiment, when an uncontrolled condition is determined for the IC engine 102, the controller 104 restricts flow of the air intake 116 through the intake valve 110. The controller 104 sends a command or signal to actuator 112 to close the valve 110. By restricting or closing off the air flow 116 through the valve 110, the fluid flow 134 from the crankcase 130 is reduced or stopped, wherein reducing the amount of incoming air reduces fluid communication and circulation between the crankcase 130 and the cylinder 108. Further, a reduced amount of air in the cylinder 108 slows or stops combustion. The IC engine system 100 may utilize any suitable method for restricting or closing off air flow into the cylinder 108. In an alternate embodiment, a valve, such as a throttle valve locate in air intake 114, may be configured to control the flow of air intake 116 to the plurality of cylinders of IC engine 102. By restricting air flow 116 into the cylinder 108, engine speed is reduced, thereby arresting the uncontrolled condition.

Figure 2:
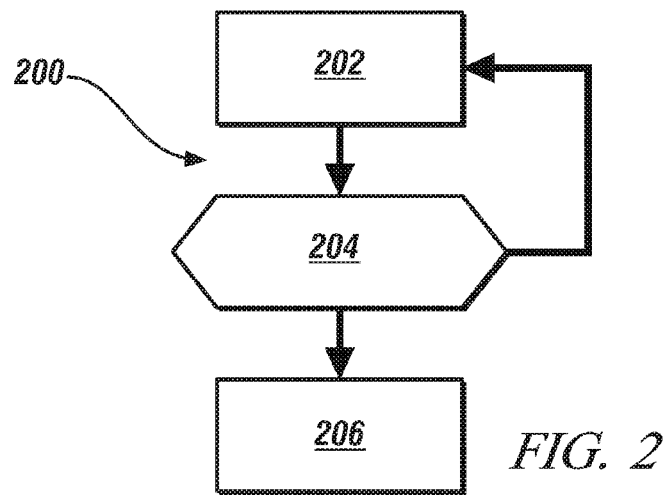
FIG. 2 is an exemplary chart of blocks that may be included in a method to arrest a runaway condition for an internal combustion engine.

FIG. 2 is an exemplary chart 200 of blocks or steps that may be included in a process or method to identify and arrest a runaway condition for the IC engine system 100 (FIG. 1). The blocks may be performed by a suitable module, control module and/or controller, such as the controller 104 (FIG. 1). In block 202, the engine is monitored for a runaway condition, which may include monitoring any suitable parameter to determine the runaway condition, such as cylinder pressure or engine speed. In block 204, the runaway condition is determined by analyzing or comparing the monitored parameter (e.g., cylinder pressure) to a limit, wherein a parameter greater than the limit indicates the runaway condition. Accordingly, in block 206, if the runaway condition is determined, air intake or flow into the cylinder 108 (FIG. 1) is restricted or closed, thereby slowing or stopping combustion of the oil as fuel within the cylinder. If the runaway condition is not identified or determined, the method continues to monitor engine parameters for the runaway condition in block 202. The exemplary method and apparatus for arresting or avoiding an uncontrolled engine condition reduces excessive operating speeds for the engine.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An internal combustion engine comprising:
   a piston disposed in a cylinder;
   a crankcase in fluid communication with the cylinder;
   a valve configured to control flow of air into the cylinder;
   an actuator coupled to the valve to control a position of the valve; and
   a controller in communication with the actuator, wherein the controller is configured to close the valve when an uncontrolled condition for the internal engine is determined, the uncontrolled condition comprising a runaway condition caused by fluid flow between the crankcase and the cylinder and combustion due to the fluid flow into the cylinder.

2. The engine of claim 1, comprising a sensor configured to determine a pressure in the cylinder.

3. The engine of claim 2, wherein the uncontrolled condition corresponds to a cylinder pressure greater than a limit.

4. The engine of claim 1, wherein the valve is positioned on the cylinder.

5. The engine of claim 1, wherein the valve in a closed position reduces circulation of air between the cylinder and the crankcase.

6. The engine of claim 1, wherein the actuator comprises a hydraulic actuator.

7. The engine of claim 1, comprising a plurality of cylinders wherein each cylinder has a corresponding valve and actuator configured to control a position of the valve to control air flow into each cylinder.

8. A method for arresting an uncontrolled condition for an engine, the method comprising:
   monitoring a pressure of a cylinder in the engine;

comparing the pressure to a pressure limit;

determining the cylinder has a runaway condition based on the pressure exceeding the pressure limit, the runaway condition caused by combustion of a fluid from a crankcase; and closing an air intake valve disposed on the cylinder based on the determined runaway condition, wherein closing the air intake valve reduces air circulation between a crankcase and the cylinder.

9. The method of claim 8, wherein closing the air intake comprises actuating the air intake valve.

10. The method of claim 9, wherein the actuating is performed by a hydraulic actuator.

11. The method of claim 8, comprising closing a plurality of air intake valves disposed on cylinders of the engine.

12. A method for arresting a runaway condition for a diesel engine having a piston disposed in a cylinder, an air intake valve disposed on the cylinder, an actuator coupled to the air intake valve, a controller coupled to the actuator and a crankcase in fluid communication with the cylinder; the method comprising:

determining an occurrence of an uncontrolled condition for the diesel engine, the uncontrolled condition comprising a runaway condition caused by fluid flow between the crankcase and the cylinder and combustion due to the fluid flow into the cylinder; and closing the air intake valve via the actuator when the uncontrolled condition occurs, wherein closing the air intake valve reduces air circulation between the crankcase and the cylinder.

13. The method of claim 12, wherein determining the occurrence of the uncontrolled condition for the diesel engine comprises determining a cylinder pressure via a sensor disposed in the cylinder.

14. The method of claim 13, wherein the uncontrolled condition corresponds to a cylinder pressure greater than a limit.

15. The method of claim 12, wherein the actuator comprises a hydraulic actuator.

16. The method of claim 12, wherein the diesel engine comprises a plurality of cylinders wherein each cylinder has a corresponding air intake valve and actuator configured to control a position of the air intake valve and wherein closing the air intake valve via the actuator comprises closing the air intake valves for each of the plurality of cylinders.

* * * * *